United States Patent

[11] 3,609,017

[72] Inventors Benjamin Nuchman
820 Birchwood Drive, Westbury, N.Y. 11590;
Sang Y. Whang, 8445 S. W. 148th Drive, Miami, Fla. 33143
[21] Appl. No. 039,346
[22] Filed May 21, 1970
[45] Patented Sept. 28, 1971
Continuation-in-part of application Ser. No. 814,895, Apr. 7, 1969, now abandoned.

[54] MEANS FOR EXTENDING THE RANGE OF KERATOMETERS
18 Claims, 6 Drawing Figs.

[52] U.S. Cl. .................................................. 351/13, 351/16
[51] Int. Cl. .................................................. A61b 3/10
[50] Field of Search ...................................... 351/1, 6, 13, 16, 39, 40

[56] References Cited
UNITED STATES PATENTS
3,542,458  11/1970  Volk.............................. 351/6 X
OTHER REFERENCES
Leroy Rubin, " Extending the Range of the Opthalmometer and Keratometer," Optical Journal & Review of Optometry, vol. XCVIII, No. 8, pps. 41– 42, 4-15-61, (351/40)

*Primary Examiner*—David Schonberg
*Assistant Examiner*—Paul A. Sacher
*Attorney*—Blum, Moscovitz, Friedman & Kaplan

ABSTRACT: Means for extending the range of a keratometer to measure the curvature of a cornea in a region spaced a greater distance from the optical axis of said keratometer than the region normally measured. Said means includes a further set of illuminated mires adapted to produce a virtual image inside the cornea larger than the virtual image produced by the original mires, and diverging lens means for producing a secondary virtual image from the virtual image produced by said further set of mires which can be read directly by said keratometer while being representative of the radius of curvature in the new region.

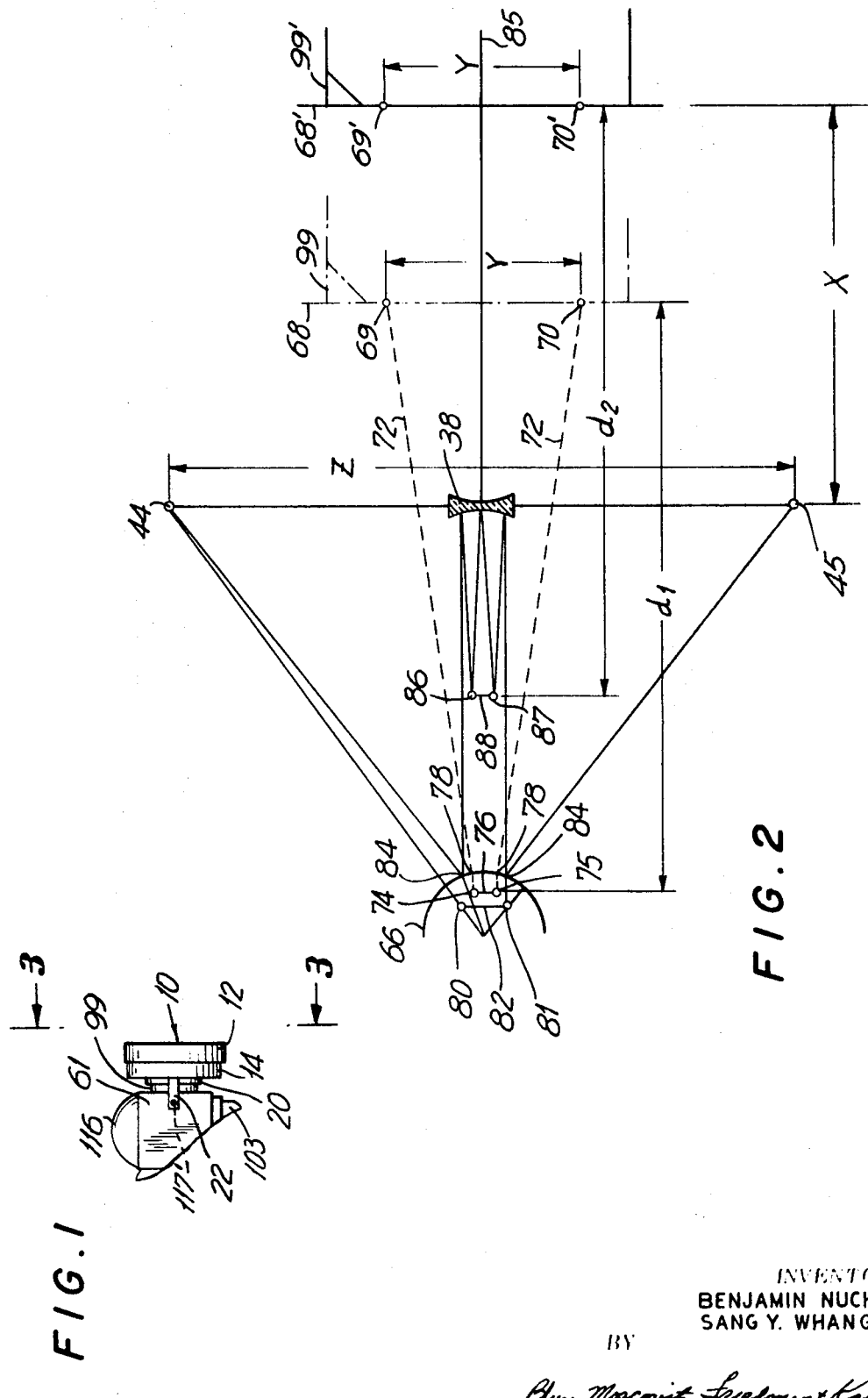

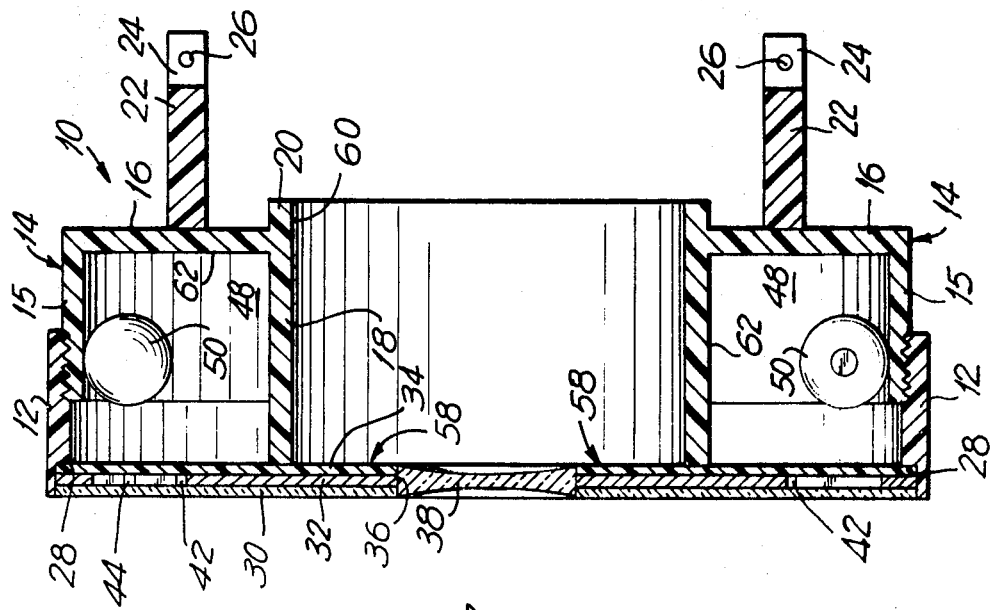
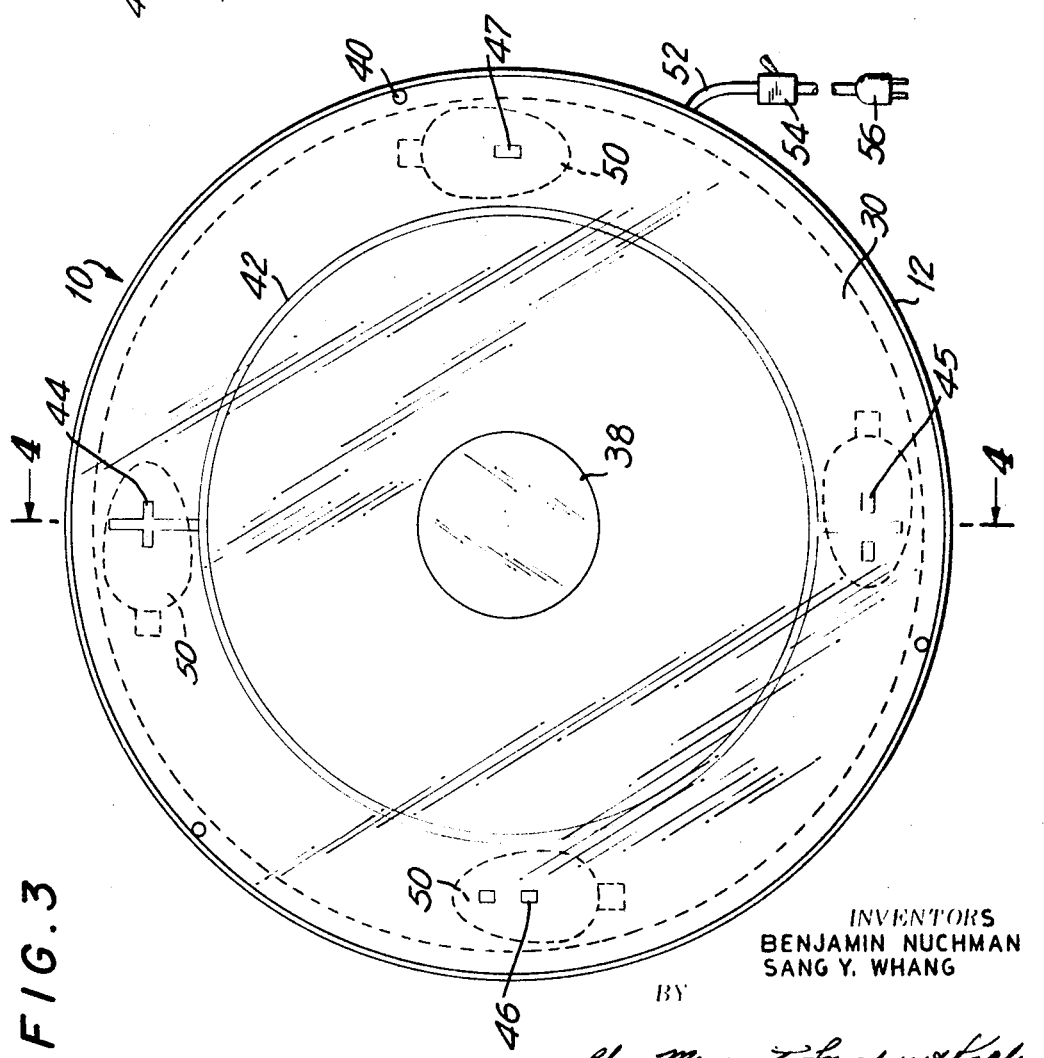

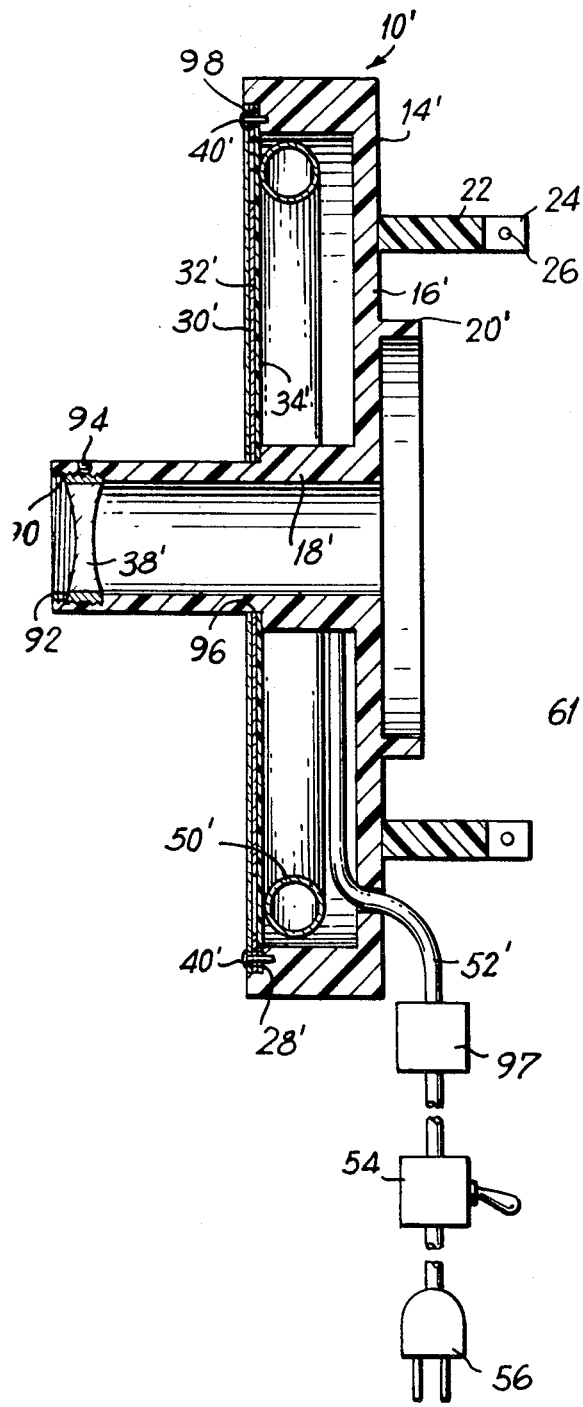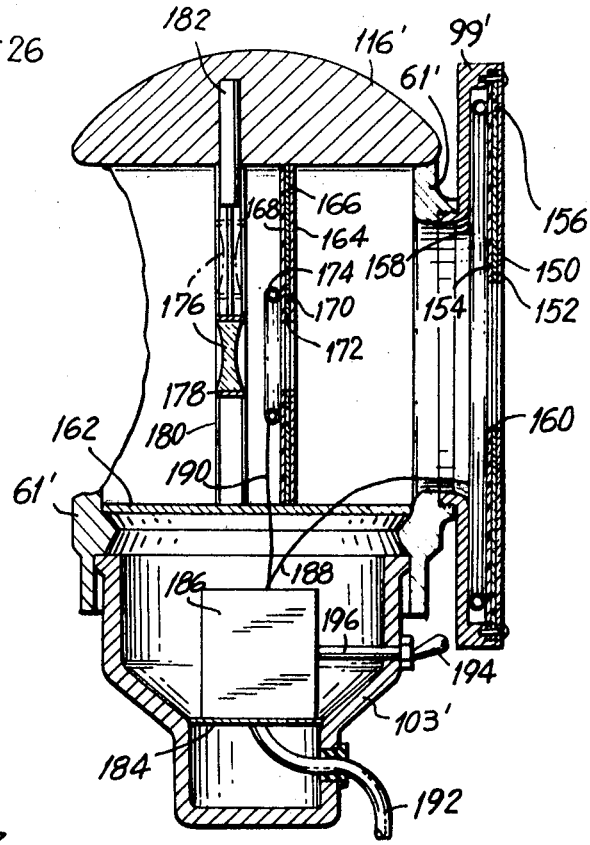

MEANS FOR EXTENDING THE RANGE OF KERATOMETERS

BACKGROUND OF THE INVENTION

This is a continuation-in-part of our copending application Ser. No. 814,895 filed Apr. 7, 1969, now abandoned.

This invention relates generally to keratometers or ophthalmometers, of the type more particularly shown and described in U.S. Pat. No. 1,750,931, issued on Mar. 18, 1930, to G. A. H. Kellner et al. One principal commercial embodiment of said keratometer is manufactured by Bausch & Lomb, Inc., the assignee of said patent.

An important application of the keratometer is the measurement of the curvature of a cornea in connection with the fitting of contact lenses. The commercial keratometer is structured to perform its measurement in the region of the cornea approximately 1.6 mm. from the optical axis of said keratometer. This would provide accurate information for the fitting of a contact lens were the human cornea precisely spherical. However, experience has shown that the human cornea is not spherical, but rather is steepest at the center and gradually flattens out as it moves away from the center. For this reason, spherical contact lenses have failed to provide a comfortable fit. Since the degree of such flattening varies with each individual, the accurate grinding and fitting of contact lenses which more closely follow the contour of the cornea requires a more precise knowledge of the curvature of each individual's cornea. For this purpose, it is necessary to obtain accurate measurements of the curvature of the cornea in regions further removed from the optical axis of said keratometer, such as the region located about 3 mm. from said optical axis. The existing commercial keratometers are incapable of reading the radius of curvature in such regions.

SUMMARY OF THE INVENTION

Generally speaking, in accordance with the invention, means are provided for extending the range of keratometers which includes a second set of illuminated mires spaced along the optical axis of said keratometer from the first set of mires provided with said keratometers and dimensioned to produce a virtual image inside the cornea which is larger than the virtual image produced by said first set of mires. Diverging lens means is provided on the optical axis of said keratometer to produce a secondary virtual image proportional to the virtual image produced by said second set of mires. Said diverging lens means and the spacing between the first and second set of mires is selected so that the dimensions of said secondary virtual image are a measure of the curvature of the cornea in a region spaced from the optical axis of said keratometer beyond the region normally examined by said existing keratometers.

Said diverging lens means is preferably disposed in the plane of said second set of mires. Separate illuminating means is provided behind said second set of mires while the first set of mires provided with the keratometer are preferably obstructed to prevent the projection of a virtual image thereby.

In one embodiment of the arrangement, according to the invention, the mires forming the second set of mires are spaced a distance equal to twice the spacing of the first set of mires and are disposed in a plane 4.417 cm. from the plane defined by said first set of mires. The diverging lens means would consist of a concave lens having a focal length of 5.796 cm.

Accordingly, it is an object of this invention to provide means for extending the range of existing keratometers to permit measurement of the curvature of a cornea in regions further removed from the optical axis of said keratometer than the regions normally examined.

Another object of the invention is to provide means for extending the range of existing keratometers which is self-contained and readily attached and removed without modification of such keratometers, thereby permitting the use of such keratometers in the usual manner as well as according to the invention.

A further object of the invention is to provide means for extending the range of existing keratometers by adding a new illuminating arrangement while utilizing the existing measuring arrangement of said keratometers.

In another embodiment of the arrangement, according to the invention, the mires forming the second set of mires are spaced a distance equal to twice the spacing of the first set of mires and are disposed in a plane 3 cm. from the plane defined by said first set of mires. The diverging lens means would consist of a concave lens having a focal length of 3.03 cm. positioned on the optical axis of the keratometer and spaced 2.8 cm. in front of the second set of mires.

In still a further embodiment of the arrangement according to the invention, a modified keratometer is provided having first and second sets of mire means and first and second illumination means for illuminating said first and second mire means respectively, said first and second illuminated mire means each producing a virtual image inside a human cornea, the dimensions of the image produced by said first mire means being a measure of the curvature of said cornea in a first region spaced a first distance from the optical axis of said keratometer, the virtual image produced by said second set of mire means having dimensions representative of the curvature of said cornea in a second region spaced a second distance from said optical axis. A diverging lens means is positioned on the optical axis of said keratometer to produce a secondary virtual image from the virtual image produced by said second set of mire means. The relative dimensions and position along said keratometer optical axis of said first and second sets of mire means and said diverging lens means are selected so that the keratometer reads directly the radius of curvature at said second region by measuring the dimensions of said secondary virtual image. Means may be provided for selectively actuating said first and second illuminating means and for selectively displacing said diverging lens means into and out of said optical axis. In one example of a modified keratometer according to the invention, the mires forming the second set of mire means are spaced a distance equal to four times the spacing of the first set of mires and are disposed in a plane about 3.9 cm. from the plane defined by said first set of mires. The diverging lens means consists of a concave lens having a focal length of 17 cm. positioned 1.2 cm. behind said first set of mires.

Still other objects and advantages of the invention will in part be obvious and will in part be apparent from the specification.

The invention accordingly comprises the features of construction, combination of elements and arrangement of parts, which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a fragmented side elevational view of the keratometer shown and described in U.S. Pat. No. 1,750,931 with the means for extending the range of said keratometer, according to the invention, secured thereto;

FIG. 2 is a diagrammatical representation of the operation of the means for extending the range of keratometers according to the invention;

FIG. 3 is a front elevational view of the means for extending the range of keratometers according to the invention, taken along lines 3—3 of FIG. 1;

FIG. 4 is a sectional view of the arrangement of FIG. 3, taken along lines 4—4;

FIG. 5 is a sectional view of a second embodiment of the keratometer attachment for extending the range of keratometers according to the invention; and FIG. 6 is a sectional view of a portion of the keratometer shown and described in U.S. Pat. No. 1,750,931 modified to incorporate means for extending the range of the keratometer according to the invention.

DESCRIPTION OF THE PREFERRED EMBODIMENT

This invention relates to an improvement in ophthalmometers or keratometers of the type shown and described in U.S. Pat. No. 1,750,931, issued on Mar. 18, 1932 to G. A. R. Kellner et al., the specification and drawings of which are incorporated by reference herein to the same extent as if they were set forth herein. As used herein, the terms "ophthalmometer" and "keratometer are used interchangeably.

As more fully described in said patent, the keratometer projects a virtual image of a target inside the cornea of a patient. The keratometer is designed to measure this image utilizing an extremely precise method of doubling. Referring now to FIG. 1 of the drawings, a fragmented view of the head of the keratometer taught in said patent, is shown. This view is taken from FIG. 1 of said patent. Housing 61 encloses a silvered mirror for reflecting light from a lamp through a condensing lens to the target for illuminating said target. Both the silvered mirror and the lens are provided with openings along the optical axis of the keratometer to permit measurement of the resultant virtual image. The target consists of a focusing ring and a group of four circumferentially spaced mires and is preferably formed from the negative of a photograph of the target in black against a white background. The negative is mounted on a glass plate for protection, said glass plate defining the outer surface of the head of the keratometer shown in FIG. 1. Both the negative and glass plates are carried within cell 99 threaded onto housing 61. Weight 116 is mounted on the top of said housing to provide balance for the keratometer while cup-shaped member 103 is removably attached to the lower side thereof and carries a light source such as a lamp for illumination of the target. One of a pair of sighting rings 117' is mounted on each side of housing 61. These sighting rings are utilized in conjunction with a pair of bead sights mounted on the body of the keratometer to provide means for adjusting the axis of the measuring unit to the horizontal plane of the patient's eyes.

In order to extend the range of the conventional keratometer according to the invention, means 10 is secured to the head thereof, as shown in FIG. 1. Said means is formed with a housing consisting of a front cylindrical portion 12 threaded on the inside surface thereof for removable engagement with a rear housing portion 14, having a correspondingly threaded, cylindrical outer wall 15, as more particularly shown in FIGS. 3 and 4. The laterally extending rear wall 16 of said rear housing portion supports a cylindrical inner wall 18. Lip 20 of said inner wall defines an aperture adapted to receive cell 99 of the head of said keratometer.

Extending from rear wall 16 are a pair of arms 22 ending in U-shaped brackets 24 for removably mounting means 10 on a conventional keratometer. As more particularly shown in FIG. 1, said arms extend to sighting rings 117' with said brackets engaging said sighting rings. Setscrews extend through apertures 26 in said brackets to secure said brackets to said sighting rings. The outer end of front housing member 12 is formed with a step shoulder 28 adapted to receive an assembly including an outer glass plate 30, a central target plate 32 and an inner plate 34, preferably formed of a plastic. The central portions of plates 30, 32 and 34 are formed with a central aperture 36 within which a diverging concave lens 38 is disposed. The plate assembly is retained in place by a plurality of screws 40 which engage in correspondingly threaded apertures in the bottom of step shoulder 28.

Target plate 32 is opaque except in the regions of focusing ring 42 and mires 44, 45, 46 and 47. Said target plate may be formed from a photographic negative, as described above, or from an opaque plate having portions cut out to define the target, and is mounted between plates 30 and 34 for protection. Disposed within the compartment 48, defined by inner and outer walls 15 and 18 of rear housing portion 14 and front housing portion 12, are a plurality of lamps 50. One of said lamps is preferably disposed behind each of said mires to insure a concentration of light therethrough, and said lamps may be connected in series or parallel as desired. Electrical cord 52 extends through rear housing 14 into compartment 50 to provide power to said lamps. Said cord is provided with a switch 54 to control the operation of said lamps and plug 56 for connection to an electrical outlet.

Means 10 is secured to the head of the keratometer in the manner described above with cell 99 extending within the aperture defined by lip 20 and inner wall 18. The mires and focusing circle of the keratometer, which are substantially identical to the mires and focusing circle of means 10, are obstructed by the opaque area 58 extending between lens 38 and inner wall 18 and therefore do not produce and image on the cornea when means 10 is in place. The inner surface 60 of said inner wall is preferably black to absorb any reflected light to avoid interference with the measurement of the virtual image produced by mires 44–47 of means 10. The inner surface 62 of compartment 50 is preferably white to reflect the maximum amount of light from lamp 50. Diverging lens 38 is disposed on the optical axis of the keratometer so that means 10 does not interfere with the measuring arrangement of said keratometer.

Turning now to FIG. 2, a diagrammatical representation of the means for extending the range of the keratometer is shown. Cornea 66 is shown schematically disposed as it would be along the optical axis 85 of the keratometer. Cell 99 of said keratometer as shown schematically in phantom lines disposed as it would be for normal operation without means 10 according to the invention mounted thereon. Said cell caries a target plate 68 having illuminated mires 69 and 70 thereon spaced a distance Y apart. As shown by dashed lines 72, these mires are projected to the cornea and reflected from the surface thereof. Since the cornea is a round protruding body with a shiny surface, a virtual image 74, 75 of mires 69, 70 is produced inside the cornea. The keratometer is designed to measure the dimensions of virtual image 74, 75 as characterized by the length of line 76 extending therebetween. Said image is spaced a distance $d_1$, from the plane including mires 69, 70. The instrument is calibrated to read the curvature of the cornea at points 78 in diopters.

However, the human cornea is not perfectly spherical and generally flattens out as it extends from the central portion thereof. In order to measure the precise curvature of the cornea in the region of this flattening, the means 10 according to the invention is mounted on the keratometer head. In order to achieve proper focusing, the entire head of the keratometer must be displaced away from the cornea as shown schematically in full lines in FIG. 2. This displacement is accomplished by means of the normal focusing arrangement of the keratometer shown in FIG. 1 of U.S. Pat. No. 1,750,931 at reference numerals 47–55. When so disposed, mires 69' and 70', carried by target plate 68' and cell 99', are obstructed and project no image. Mires 44 and 45 of the means 10 according to the invention are shown schematically in FIG. 2 disposed at a distance X from the plane of keratometer mires 69', 70' which are spaced a distance Y apart. Mires 44, 45 are shown spaced a distance Z apart, Z being greater than Y.

As shown in FIG. 2, mires 44, 45 are illuminated and produce a virtual image 80, 81 behind cornea 66. The dimensions of this second virtual image, as represented by the length of line 82, are greater than fall dimensions the first virtual image 74, 75 and are proportional to the curvature of cornea 66 at points 84. Points 84 are spaced a greater distance from the optical axis 85 of the keratometer than are points 78, at which the curvature is measured by the conventional keratometer. However, the dimensions of image 80, 81 are too large to be measured by the conventional keratometer. Accordingly, diverging lens 38 is provided to produce a secondary virtual image 86, 87 proportional in size to virtual image 80, 81, but of dimensions represented by the length of line 88 which fall within the range adapted to be read by the keratometer. Specifically, lens 38 is selected to produce a secondary virtual image 86, 87 for a given radius of curvature at points 84 identical to the image 74, 75 produced by the conventional keratometer detecting said radius of curvature at points 78. In this manner, the conventional keratometer can be utilized to read the radius of curvature at points 84 when means 10 is applied thereto, without the use of conversion tables or new dials.

The determination of the dimension X and the focal length of lens 38 is based on conventional trigonometric calculations. The dimensions Y is known, being the spacing of the mires of the conventional keratometer. The dimension Z is arbitrarily selected as is the new virtual image size as represented by the length of line 82. The latter determines the region of the cornea to be examined according to the invention. In order to calculate X and the focal length of lens 38, it is assumed that the cornea is spherical, in which case the curvature at point 78 and 84 would be equal. Using this spherical cornea of known radius, the distance between the cornea and the new mire surface for the particular image size desired is determined using trigonometric calculations. The larger the image desired, the smaller the distance.

The focal length of lens 38 is then selected to produce a secondary virtual image 86, 87 of dimensions equal to the dimensions of the virtual image 74, 75 produced by the conventional keratometer when applied to the assumed spherical cornea. In other words, the secondary virtual image 86, 87 is selected so that the length of line 88 equals the length of line 76. The latter calculations utilize the conventional formula for calculating a lens focal length. Lens 38 need not be in the same plane as mires 44, 45, the focal length of said lens being determined by the position thereof along optical axis 85.

The dimension X is determined by calculating the exact location of said secondary virtual image relative to mires 44, 45 from the known information concerning the positioning of the lens (a matter of selection) and the previously determined position of the virtual image 80, 81. The dimension X is selected so that the distance $d_2$, equals $d_1$, whereby the already calibrated keratometer reads directly the curvature of the cornea at points 84.

The distance Y between the mires of a standard keratometer is generally 64 mm. In one embodiment of means 10 according to the invention, the dimension Z of mires 44, 45 was selected to be twice the dimension Y, or 128 mm. Further, the new image size was selected to be twice the original image size. Assuming that the cornea was a sphere of the radius of 0.78 cm., it was determined that the conventional keratometer would produce a virtual image wherein line 78 was 3.2 mm. in length. It was also determined that the virtual image 80, 81 to be produced by the mires 44, 45 should be twice the size of the virtual image 74, 75, whereby line 82 was 6.4 mm. in length. Further, the lens 38 was disposed in the same plane as mires 44, 45. Based on the above-described calculations, it was determined that the dimension X should be 44.17 mm. while the lens 38 should have a focal length of 57.96 mm. (-17.25 diopters). Accordingly, it was found that by properly selecting the parameters of the means 10, the curvature of any region of the cornea can be accurately measured by means of the conventional keratometer in combination with a means 10 selected for use with that particular region.

Means 10, according to the invention, may be modified by substituting fiber optic or other illuminating means for lamps 50, which are shown by way of example and not by way of limitation. Means may also be provided for mounting lens 38 outside the plane of mires 44–47. Further, a more accurate and complex divergent lens means can be substituted for the simple convex lens shown in the drawings.

A second embodiment of the means for extending the range of the keratometer according to the invention, also in the form of an attachment is shown in FIG. 5. Like reference numerals are utilized for corresponding elements in the embodiments of FIGS. 3 and 4 and FIG. 5. Attachment 10' is formed with a single housing portion 14' having a rear wall 16' from which a pair of arms 22 extend for removable mounting of said attachment 10' on a conventional keratometer as described above. The housing 14' is provided with an inner wall 18' defining a cylindrical aperture aligned with the optical axis of the keratometer. The outer end of inner wall 18' is formed with a threaded area 90 adapted to receive a correspondingly threaded lens retainer 92 within which is mounted a concave lens 38'. Setscrews 94 projects through an aperture in said outer end of inner wall 18' for engaging against lens retainer 92 for fixing said lens retainer and lens in position. Also projecting from rear wall 16' is a cylindrical lip 20' adapted to receive cell 99 of the head of the keratometer or to be received within a lip in said cell in flush engagement with the faceplate of the keratometer. The outer end of housing 14' is provided with a step shoulder 28' adapted to receive an assembly including outer glass plate 30', a central target plate plate 32' and inner plate 34'. This plate assembly is formed with a central aperture 86 to receive the cylindrical inner wall 18' therethrough. The plate assembly is retained in place by a plurality of screws 40' received in correspondingly threaded apertures in the bottom of stop shoulder 28'. Screws 40' extend through circumferentially extending short slots 88 in the plate assembly which permit the angular positioning of mires 44 in target plate 32 with the corresponding mires of the keratometer. Glass plates 30 and 30' and target plates 32 and 32' are substantially identical. The latter may be separate plates or merely silk screened layers on the surface of plates 30 and 30'. However, inner plate 34' of attachment 10' is preferably formed of a material adapted to diffuse the light received from the light source 50', such as diffusing paper. Said light source is in the form of a toroidal fluorescent lamp mounted in substantial alignment with mires 44. The diffusing characteristics of plate 34' insures that sufficient light reaches focusing ring 42 to illuminate same. Power for fluorescent lamp 50' is obtained along cable 52' which is connected to a ballast and transformer 97 which in turn is connected to a plug 56. Switch 54 is connected in the circuit to permit the turning on and turning off of the lamp.

The embodiment of FIG. 5 permits the construction of a more compact attachment requiring a lesser traverse of the normal focusing arrangement of the keratometer between readings with each set of mires. Specifically, in one example of the arrangement of FIG. 5, the dimension Z of mires 44, 45 was selected to be twice the dimension Y, or 128 mm.

As in the first example, the new image size was selected to be twice the original image size. The dimension X between mires 44, 45 on target plate 32' and mires 69, 70 of the keratometer is 30 mm. Converging lens 38' is positioned 2.8 cm. in front of mires 44, 45 of plate 32' and has a focal length of 30.3 mm. (-33 diopters).

The arrangement according to the invention may be calibrated to insure accuracy by substituting a steel spherical ball of known radius of curvature for the human cornea. For calibration purposes, lens 38' is displaceable along inner wall 18' for precise positioning so that the secondary virtual image produced with attachment 10' on the keratometer is positioned at the same location as the virtual image produced when the keratometer is utilized without the attachment.

In the embodiment of FIG. 5, the secondary virtual image 88 is brought closer to the virtual image 76 produced by the keratometer mires. Since this distance represents the distance which must be traversed by the focusing arrangement of the keratometer, the required distance of traverse is substantially reduced to about 14 mm. in the above described example. In the specific example of the arrangement of FIGS. 3 and 4, the distance that the focusing mechanism of the keratometer had to traverse was about 28 mm.

By the arrangements described above, an integral attachment to a conventional keratometer is provided which may be readily secured to and removed from the head of said keratometer without modification thereof. The means 10 and 10' according to the invention utilizes the existing measurement arrangement of the keratometer to measure a new virtual image produced thereby through the use of a further set of illuminated mires and may be readily used by anyone trained in the use of the conventional keratometer.

Referring now to FIG. 6, an embodiment of the means for extending the range of a keratometer is shown wherein the structure of the keratometer is altered to produce a new keratometer. FIG. 6 is a cross-sectional view taken along a vertical plane passing through the optical axis of the keratometer showing the head of the keratometer as modified according to the invention. As more particularly shown in FIG. 4 of U.S. Pat. No. 1,750,931, housing 61 and cup-shaped member 103 together contain the illuminating arrangement for the mires mounted within cell 99 defining the face of the keratometer. These illuminating elements include an incandescent lamp 104 held in a receptacle 105; a horizontal ground glass diffusing plate 108 mounted above said lamp and having a centrally disposed metal disc 109 attached thereto by means of screw and nut 110; a centrally apertured reflector 107 below the lamp; a silver reflector 111 having an elliptically shaped central opening 112 held in place at an angle of approximately 45° within housing 61 by strips 113; and a planoconvex lens 97 which is provided with a centrally disposed opening 98 and positioned adjacent the plate bearing the keratometer mires, all of said elements being more particularly shown in said FIG. 4 of said U.S. Pat. No. 1,750,931.

As shown in FIG. 6, said illuminating elements are eliminated from the head of the modified keratometer according to the invention. In said modified keratometer, a plate assembly consisting of an outer glass plate 150, a central target plate 152 and an inner diffusing plate 154 is mounted with cell 99' which is threaded on housing 61'. Target plate 152 is provided with a set of mires and a focusing circle 156 which correspond to the second set of mires 44, 45 of FIG. 2. Mires 156 are adapted to produce the large virtual image 82.

Mounted immediately behind diffusing plate 154 is a toroidal fluorescent lamp substantially aligned with mires 156 to provide illumination for said mires. A central opening 160 is provided in the plate assembly 150, 152, 154 to provide an optical path for the keratometer optical system to detect the virtual images produced by the mires and for the projection of the other set of mires described below.

A support bracket 162 is mounted on the bottom of housing 61' intermediate said housing and cup-shaped member 103'. Supported between weight 116' and said bracket is a second plate assembly consisting of a glass plate 164, a central target plate 166 and an inner diffusing plate 168. Target plate 166 is formed with a focusing ring and mires 170 which correspond to the mires 69, 70 of the usual keratometer. The plate assembly 164, 166, 168 is formed with a central opening 172 on the optical axis corresponding to central opening 160 in plate assembly 150, 152, 154 but of smaller diameter. A second toroidal fluorescent lamp 174 is mounted adjacent diffusing plate 168 in substantial alignment with mires 170 for the illumination thereof.

Mounted immediately behind plate assembly 164, 166, 168 is diverging lens 176 adapted for displacement into and out of alignment with the optical axis of the keratometer. For this purpose, lens 176 is mounted in a holder 178, which in turn is mounted on tracks 180 for displacement by solenoid 182 between two positions. Said solenoid is mounted within weight 116'. As shown in FIG. 6, lens 176 is positioned on the optical axis and is displaceable to a second position as shown in dotted lines.

A bracket 184 extends across the bottom of cup-shaped member 103' and supports a container 186 within which are mounted the transformer, ballast and related circuit elements necessary for controlling and powering fluorescent lamps 158 and 174. Box 186 is coupled to lamps 158 and 174 by cables 188 and 190 respectively. Cable 192 would be connected to a source of power in a conventional manner. Box 186 is coupled to a three position switch 194 by cable 196, said switch being mounted on cup-shaped member 103'. Switch 194 would be adapted in a first position to light only lamp 174 for the illumination of the first set of mires. In this position, solenoid 182 would be actuated to retain lens 176 out of the optical path in the position shown by dotted lines in FIG. 6. A second position of switch 194 would light only lamp 158 to illuminate mires 156. In this second position solenoid 182 would be actuated to position lens 176 along the optical axis of the keratometer as shown in FIG. 6. The third position of switch 194 would be an off position.

By the foregoing arrangement, a single keratometer can selectively measure the radius of curvature of a human cornea at two regions spaced from the optical axis of the keratometer. By using the fluorescent lamps, two separate illumination arrangements can be provided which occupy a minimum of space, eliminate the necessity of the complex illuminating arrangement of the basic keratometer, and operate with a minimum of heat.

In one example of a modified keratometer according to the invention, mires 156 are spaced 256 mm. apart, four times the spacing of mires 170. The mires 170 are spaced at a distance 39.15 mm. from mires 156, as measured along the optical axis of the keratometer while lens 176 is positioned 51 mm. from mires 170, also as measured along the optical axis. The focal length of said lens is 17 cm. (−5.88 diopters).

As in the case of the embodiments of the arrangement according to the invention in the form of attachments to the basic keratometer, the focal length of lens 176, its position and the position of mires 170 and 156 would all be selected so that the keratometer will read directly the radius of curvature in two regions by measuring the dimensions of the virtual image produced by mires 170 and the secondary virtual image produced by mires 156 and lens 176. Thus, if properly dimensioned, the first and second sets of mires could be disposed in the same plane on a single target plate within an expanded cell 99' and a diverging lens corresponding to lens 126 could be removably mounted in front of and outside of cell 99'. The latter arrangement would permit manual mounting and dismounting of the lens and avoid the necessity for solenoid 182. If necessary, the range of traverse of the focusing arrangement shown at reference numerals 47–55 of U.S. Pat. No. 1,750,931 can be expanded to permit the appropriate traverse between the two measuring positions of the modified keratometer.

By means of the foregoing arrangements, the accuracy of the measurement of the curvature of the cornea is greatly increased, permitting a substantial increase in the accuracy of fitting contact lenses.

It will thus be seen that the object set forth above, among those made apparent from the preceding description, are efficiently obtained, and since certain changes may be made in the above constructions without departing from the spirit and scope of the invention, it is intended that all matter contained in the above description or shown in the accompanying drawings shall be interpreted as illustrative and not in a limiting sense.

What is claimed is:

1. In a keratometer, the improvement which comprises a first set of mire means aligned with the optical axis of said keratometer; first illumination means for illuminating said first set of mire means for producing a virtual image inside a human cornea, the dimensions of sad image being a measure of the curvature of said cornea in a first region spaced a first distance from said optical axis; a second set of illuminated mires aligned with said optical axis; second illumination means for illuminating said second set of mire means for producing a virtual image inside said cornea having dimensions representative of the curvature of said cornea in a second region spaced a second distance from said optical axis; and diverging lens means disposable on the optical axis of said keratometer to produce when so disposed a secondary virtual image from the virtual image produced by said second set of mire means, said diverging lens means, the relative position along said optical axis of said diverging lens means and said first and second sets of mire means and the relative dimensions of said first and second sets of mire means all being selected so that the keratometer reads directly the radius of curvature at said second region by measuring the dimensions of said secondary virtual image.

2. The arrangement as recited in claim 1, including displacement means for selectively displacing said diverging lens means into and out of alignment with said optical axis.

3. The arrangement as recited in claim 2, including switch means for selectively actuating one or the other of said illumination means.

4. The arrangement as recited in claim 3, wherein said switch means is coupled with said displacement means for the simultaneous positioning of said diverging lens means in alignment with said optical axis when said second illumination means is actuated and for the simultaneous positioning of said diverging lens means away from said optical axis when said first illumination means is actuated.

5. The arrangement is recited in claim 1, wherein said first and second illumination means are each formed from a substantially toroidal fluorescent lamp positioned respectively substantially adjacent to said first and second mire means, said keratometer including light diverging means intermediate each fluorescent lamp and its associated mire means.

6. The arrangement as recited in claim 1, wherein said keratometer includes a head portion in alignment with the optical axis thereof, said first and second mire means, said first and second illumination means, and said diverging lens means all being mounted within said head portion.

7. The arrangement as recited in claim 1, wherein said diverging lens, the relative position along said optical axis of said first and second mire means and said diverging lens, and the dimensions of said first and second mire means are selected so that the dimensions of said secondary virtual image substantially equals the dimensions of the virtual image that would be produced by said first set of mire means were the radius of curvature at said first region equal to the radius of curvature at said second region, and so that said secondary virtual image is spaced from said first set of mire means when said keratometer is focused sn said secondary virtual image a distance equal to the spacing between the virtual image produced by said first set of mire means when said keratometer is focused thereon and said first set of mire means.

8. In a keratometer for producing a virtual image inside a human cornea from a first set of illuminated mire means, the dimensions of said image being a measure of the curvature of said cornea in a first region spiced a first distance from the optical axis of said keratometer, the improvement which comprises a second set of illuminated mire means spiced along said optical axis from said first set of mire means and dimensioned to produce a virtual image inside said cornea having dimensions representative of the curvature of said cornea in a second region spaced a second distance from said optical axis; and diverging lens means disposed in front of said keratometer on said optical axis to produce a secondary virtual image from the virtual image produced by said second set of mire means, said lens means and the spacing between said first and second sets of mire means being selected so that the keratometer reads directly the radius of curvature at said second region by measuring the dimensions of said secondary virtual image and wherein the virtual image produced by said second set of mire means is larger than the virtual image produced by said first set of mire means—has been inserted.

9. The arrangement as recited in claim 8, wherein said lens means and the spacing between said first and second sets of mire means are selected so that the dimensions of said secondary virtual image equals the dimensions of the virtual image that would be produced by said first set of mire means were said radius of curvature at said first region equal to said radius of curvature at said second region, and so that said secondary virtual image is spaced from said first set of mires means when said keratometer is focused on said secondary virtual image produced by said second set of mire means a distance equal to the spacing between the virtual image produced by said first set of mire means when said keratometer is focused thereon and said first set of mire means.

10. The arrangement as recited in claim 9, including means for blocking said first set of mire means to prevent the production of a virtual image thereby.

11. An arrangement as recited in claim 8, wherein said first and second sets of mire means each includes at least one pair of spaced mire means, said pair of spaced mire means of said second set being spaced twice the spacing of said pair of mire means of said first set, said second set of mire means lying in a plane spaced 4.417 cm. from the plane including said first set of mire means.

12. An arrangement as recited in claim 11, wherein said diverging lens means includes a diverging lens having a focal length of 5.796 cm. (−17.25 diopters), said lens being disposed in the plane including said second set of mire means.

13. An arrangement as recited in claim 8, wherein said diverging lens means includes a concave lens disposed in the plane including said second set of mire means.

14. An arrangement as recited in claim 8, including a housing for carrying said second set of illuminated mire means and said lens means, and means for mounting said housing on said keratometer with said second set of mire means and lens means aligned with the optical axis thereof.

15. An arrangement as recited in claim 14, wherein said keratometer includes a head portion containing said first set of mire means, and a pair of projections extending laterally from said head portion, said mounting means including a pair of arms extending from said housing and adapted to engage said projections.

16. An arrangement as recited in claim 14, including lighting means disposed within said housing behind said second set of mire means for illuminating said mire means.

17. An arrangement as recited in claim 8, wherein said lighting means comprises a toroidal fluorescent lamp in substantial alignment with said second set of mire means and diffusing means intermediate said fluorescent lamp and said second set of mire means.

18. An arrangement as recited in claim 8, wherein said first and second sets of mire means each includes at least one pair of spaced mire means, said pair of spaced mire means of said second set being spaced twice the distance of said pair of mire means of said first set, said second set of mire means lying in a plane about 3 cm. in front of the plane including said first set of mire means, said diverging lens means including a diverging lens having a focal length of about 3.03 cm. (−33 diopters), said lens being disposed in a plane about 2.8 cm. in front of the plane including said second set of mire means.